(12) United States Patent
Koo (10) Patent No.: US 9,162,660 B2
(45) Date of Patent: Oct. 20, 2015

(54) ELECTRONIC HYDRAULIC BRAKE DEVICE

(71) Applicant: HYUNDAI MOBIS CO., LTD., Seoul (KR)

(72) Inventor: Chang Hoe Koo, Incheon (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 63 days.

(21) Appl. No.: 14/088,261

(22) Filed: Nov. 22, 2013

(65) Prior Publication Data

US 2014/0354036 A1 Dec. 4, 2014

(30) Foreign Application Priority Data

May 29, 2013 (KR) ........................ 10-2013-0061237

(51) Int. Cl.
| | |
|---|---|
| *B60T 13/14* | (2006.01) |
| *B60T 13/68* | (2006.01) |
| *B60T 7/04* | (2006.01) |
| *B60T 13/66* | (2006.01) |
| *B60T 13/74* | (2006.01) |

(52) U.S. Cl.
CPC .............. *B60T 13/686* (2013.01); *B60T 7/042* (2013.01); *B60T 13/146* (2013.01); *B60T 13/662* (2013.01); *B60T 13/745* (2013.01)

(58) Field of Classification Search
CPC ... B60T 13/168; B60T 13/686; B60T 13/745; B60T 13/66; B60T 13/58; B60T 13/588; B60T 13/142; B60T 15/028; B60T 13/146
See application file for complete search history.

(56) References Cited

U.S. PATENT DOCUMENTS

| | | | |
|---|---|---|---|
| 8,827,377 B2* | 9/2014 | Nishioka et al. ............ | 303/113.1 |
| 2011/0241419 A1* | 10/2011 | Ohkubo et al. ............... | 303/9.62 |
| 2013/0207452 A1* | 8/2013 | Gilles et al. .................. | 303/9.75 |
| 2013/0214587 A1* | 8/2013 | Yang ............................. | 303/6.01 |
| 2014/0028083 A1* | 1/2014 | Gerdes et al. ................ | 303/6.01 |
| 2014/0203626 A1* | 7/2014 | Biller et al. ...................... | 303/10 |
| 2014/0265547 A1* | 9/2014 | Ganzel ............................ | 303/66 |

FOREIGN PATENT DOCUMENTS

KR  10-2007-0104982 A  10/2007

* cited by examiner

*Primary Examiner* — Anna Momper
(74) *Attorney, Agent, or Firm* — Knobbe Martens Olson & Bear LLP (57) ABSTRACT

Exemplary embodiments of the present invention relate to an electronic hydraulic brake device, including: a pedal cylinder configured to generate an oil pressure by a pressure of a pedal; a master cylinder configured to generate the oil pressure by sensing the pedal; wheel cylinders configured to be each mounted at a plurality of wheels and provide a braking force to the wheels; a storage configured to store a fluid; a mixing circuit configured to connect the pedal cylinder to some of the wheel cylinders, and communicate with the storage and the master cylinder; a master circuit configured to connect the master cylinder to the wheel cylinder and communicate with the storage; and a hydraulic compartment configured to connect the mixing circuit to the master circuit and limit a movement of the fluid.

16 Claims, 6 Drawing Sheets

ELECTRONIC HYDRAULIC BRAKE DEVICE

CROSS-REFERENCES TO RELATED APPLICATIONS

The present application claims priority under 35 U.S.C 119(a) to Korean Application No. 10-2013-0061237, filed on May 29, 2013, in the Korean Intellectual Property Office, which is incorporated herein by reference in its entirety set forth in full.

BACKGROUND OF THE INVENTION

The present invention relate to an electronic hydraulic brake device, and more particularly, to an electronic hydraulic brake device capable of separating hydraulic lines even though a pedal cylinder connected a brake pedal has one chamber.

Generally, an electronic hydraulic brake device uses a sensor to sense a driver's pedal pressure and then controls a braking pressure of each wheel based on an oil pressure of a master cylinder operated by a motor.

The electronic hydraulic brake device includes a sensor sensing a stroke of a pedal so as to enable the driver to know the braking pressure.

Further, the electronic hydraulic brake device includes a pedal travel simulator to enable the driver to feel the pedal pressure like a general hydraulic brake device.

Therefore, when the driver presses on the brake pedal, an electronic control unit senses the pressed degree to supply the oil pressure to the master cylinder.

Further, the master cylinder delivers a brake oil pressure to wheel cylinders of each wheel to provide a braking force to each wheel.

Meanwhile, Background Art of the present invention is disclosed in Korean Patent Laid-Open Publication No. 2007-0104982 (Published on Oct. 30, 2007, Title of The Invention: Control Apparatus For Valve in Electronic Hydraulic Brake System).

In accordance with the related art, the electronic hydraulic brake device may separate the hydraulic lines using an isolation valve and stops a vehicle by the remaining hydraulic lines when some of the hydraulic lines are damaged.

However, since the pedal cylinder connected to the pedal has two chambers to possibly separate the hydraulic lines, a full length of an actuator becomes long and the number of components increases, thereby increasing a weight.

Further, when the pedal cylinder has the two chambers, two valves are mounted to control the brake oil pressure between each chamber and the wheel cylinders, such that the number of valves may increase.

Therefore, there is a need to improve the problem.

SUMMARY OF THE INVENTION

An embodiment of the present invention relates to an electronic hydraulic brake device capable of reducing a full length and the number of valves by separating hydraulic lines even though a pedal cylinder is formed to have one chamber.

In one embodiment, an electronic hydraulic brake device includes: a pedal cylinder configured to generate an oil pressure by a pressure of a pedal; a master cylinder configured to generate the oil pressure by sensing the pedal; wheel cylinders configured to be each mounted at a plurality of wheels and provide a braking force to the wheels; a storage configured to store a fluid; a mixing circuit configured to connect the pedal cylinder to some of the wheel cylinders and guide the fluid, and communicate with the storage and the master cylinder; a master circuit configured to connect the master cylinder to the wheel cylinder which is not connected to the mixing circuit and guide the fluid, and communicate with the storage; and a hydraulic compartment configured to connect the mixing circuit to the master circuit and limit a movement of the fluid.

The pedal cylinder may form one chamber.

The mixing circuit may include: a pedal storage configured to connect the storage to the pedal cylinder; a pedal interruption part configured to be connected to the pedal cylinder and interrupt the fluid; a mixing interruption part configured to connect the pedal cylinder to the master cylinder and interrupt the fluid; a mixing braking part configured to connect the pedal interruption part to the mixing interruption part, be connected to the wheel cylinder, and interrupt the fluid; and a mixing storage configured to connect the mixing braking part to the storage and guide the fluid.

The pedal interruption part may include: a pedal interruption passage configured to be connected to the pedal cylinder; and a pedal interruption valve configured to be mounted in the pedal interruption passage to open and close the pedal interruption passage.

The mixing interruption part may include: a mixing interruption passage configured to be connected to the pedal cylinder; a mixing interruption valve configured to be mounted in the mixing interruption passage to open and close the mixing interruption passage; a mixing check passage configured to connect the mixing interruption passage to the master cylinder and be provided with a check valve; and a mixing control passage configured to connect the mixing interruption passage to the master cylinder and guide the fluid.

The mixing interruption valve may be a solenoid valve of a normal close type which is closed in a normal state and operated to be opened depending on a control signal.

The mixing braking part may include: a mixing connection passage configured to connect the pedal interruption valve to the mixing interruption valve and communicate with the mixing check passage; a mixing connection valve configured to be mounted in the mixing connection passage to open and close the mixing connection passage; a mixing braking passage configured to connect the mixing connection valve to the wheel cylinder; and a mixing braking valve configured to be mounted in the mixing braking passage to open and close the mixing braking passage.

The mixing connection valve may be a solenoid valve of a normal open type which is opened in a normal state and operated to be closed depending on the control signal.

The mixing storage may include: a mixing storage passage configured to connect the mixing braking passage to the storage; and a mixing storage valve configured to be mounted in the mixing storage passage to open and close the mixing storage passage.

The master circuit may include: a master supply part configured to connect the storage to the master cylinder and be provided with a check valve; a master providing part configured to connect the master cylinder to the wheel cylinder and interrupt the fluid; and a master storage configured to connect the master braking part to the storage and guide the fluid.

The master braking part may include: a master connection passage configured to be connected to the master supply part; a master connection valve configured to be mounted in the master connection passage to open and close the master connection path; a master braking passage configured to connect the master connection valve to the wheel cylinder; and a master braking valve configured to be mounted in the master braking passage to open and close the master braking passage.

The master connection valve may be a solenoid valve of a normal open type which is opened in a normal state and operated to be closed depending on the control signal.

The master storage may include: a master storage passage configured to connect the master braking passage to the storage; and a master braking valve configured to be mounted in the master storage passage to open and close the master storage passage.

The hydraulic compartment may include: a hydraulic passage configured to connect the mixing circuit to the master circuit; a compartment valve configured to be mounted in the hydraulic passage to open and close the hydraulic passage; a mixing measuring device configured to be mounted in the mixing circuit to measure the oil pressure of the mixing circuit; and a master measuring device configured to be mounted in the master circuit to measure the oil pressure of the master circuit.

The electronic hydraulic brake device may further include: a foot effort providing part configured to be connected to the pedal cylinder and provide a foot effort to the pedal.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Hereinafter, embodiments of the present invention will be described with reference to accompanying drawings. However, the embodiments are for illustrative purposes only and are not intended to limit the scope of the invention.

Hereinafter, an electronic hydraulic brake device in accordance with an embodiment of the present invention will be described with reference to the accompanying drawings. In the present description, thicknesses of lines, sizes of components, or the like, illustrated in the accompanying drawings may be exaggerated for clarity and convenience of explanation. Further, the following terminologies are defined in consideration of the functions in the present invention and may be construed in different ways by intention or practice of users and operators. Therefore, the definitions of terms used in the present description should be construed based on the contents throughout the specification.

Figure 1:
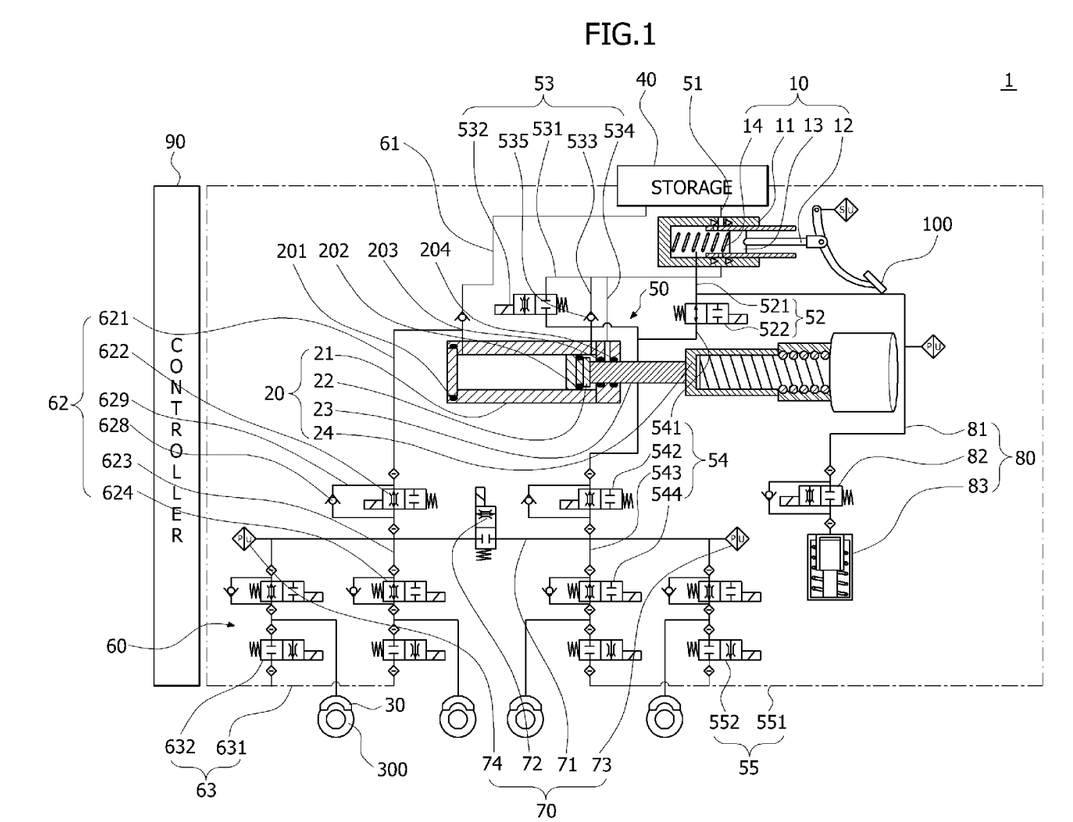
FIG. 1 is a diagram schematically illustrating an electronic hydraulic brake device in accordance with an embodiment of the present invention.
Figure 2:
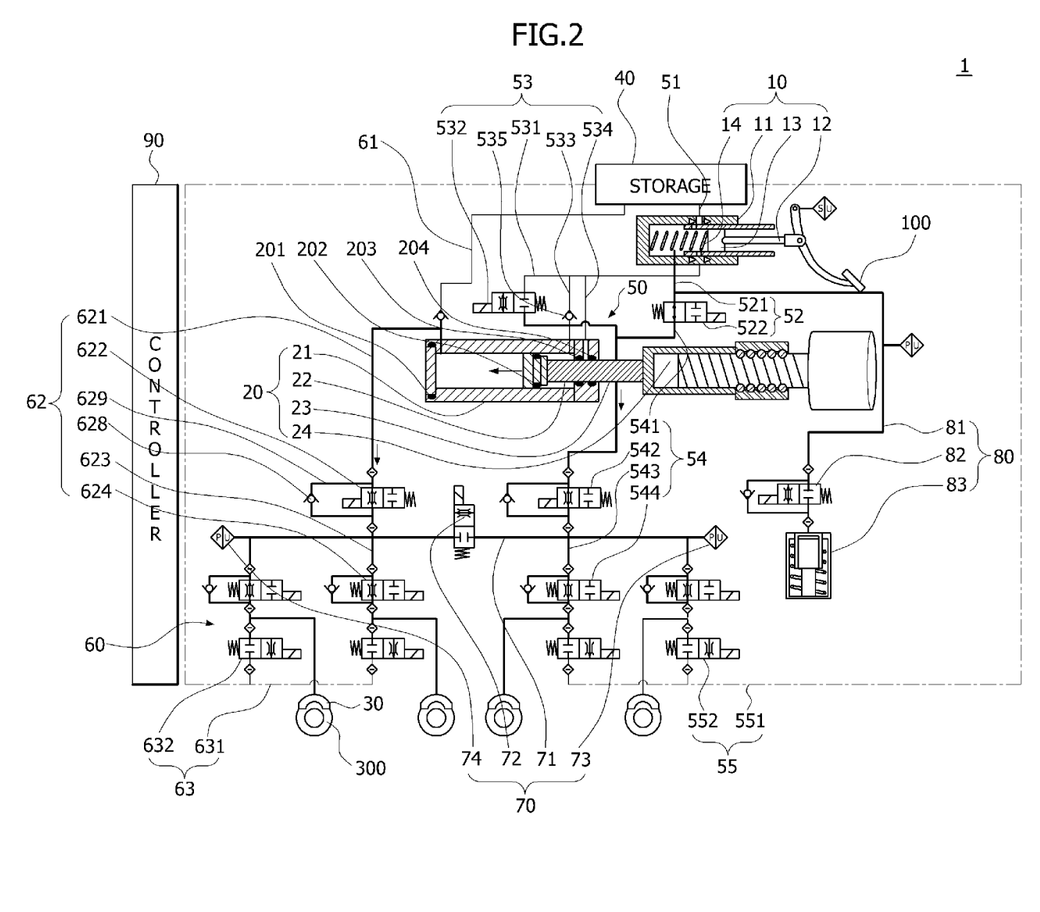
FIG. 2 is a diagram schematically illustrating a flow of fluid when a controller in the hydraulic brake device in accordance with the embodiment of the present invention is defective.
Figure 3:
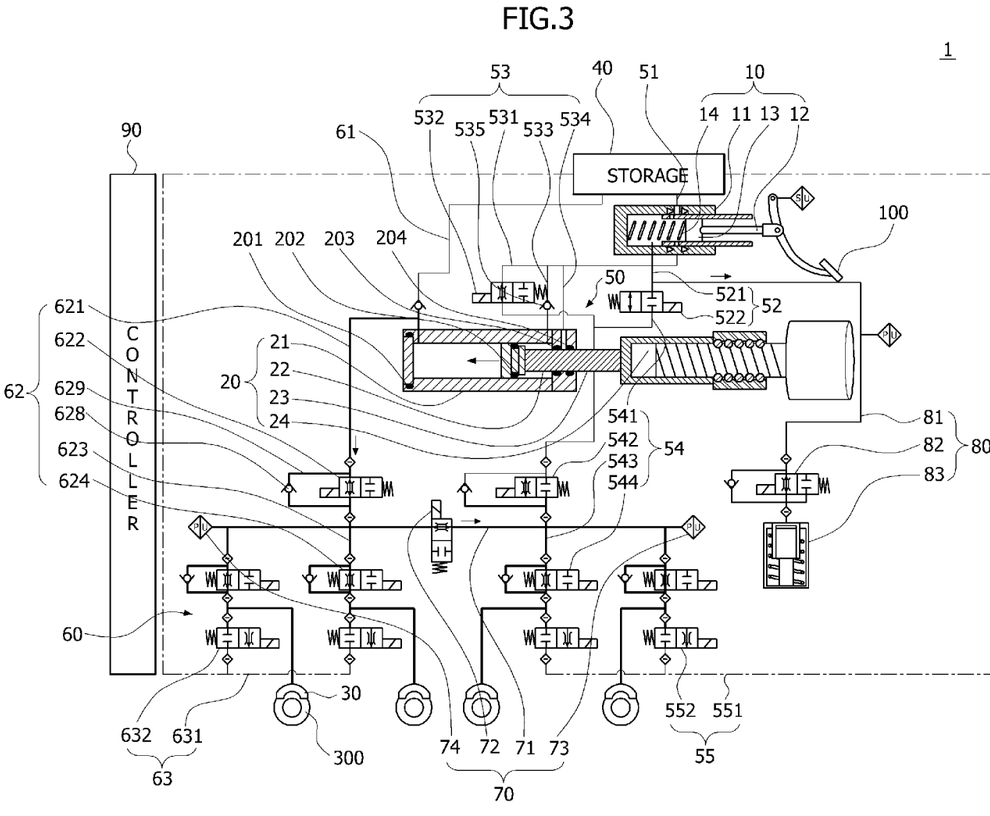
FIG. 3 is a diagram schematically illustrating the flow of fluid in a low pressure state in the electronic hydraulic brake device in accordance with the embodiment of the present invention.

FIG. 1 is a diagram schematically illustrating an electronic hydraulic brake device in accordance with an embodiment of the present invention, FIG. 2 is a diagram schematically illustrating a flow of fluid when a controller in the hydraulic brake device in accordance with the embodiment of the present invention is defective, and FIG. 3 is a diagram schematically illustrating the flow of fluid in a low pressure state in the electronic hydraulic brake device in accordance with the embodiment of the present invention.

Figure 4:
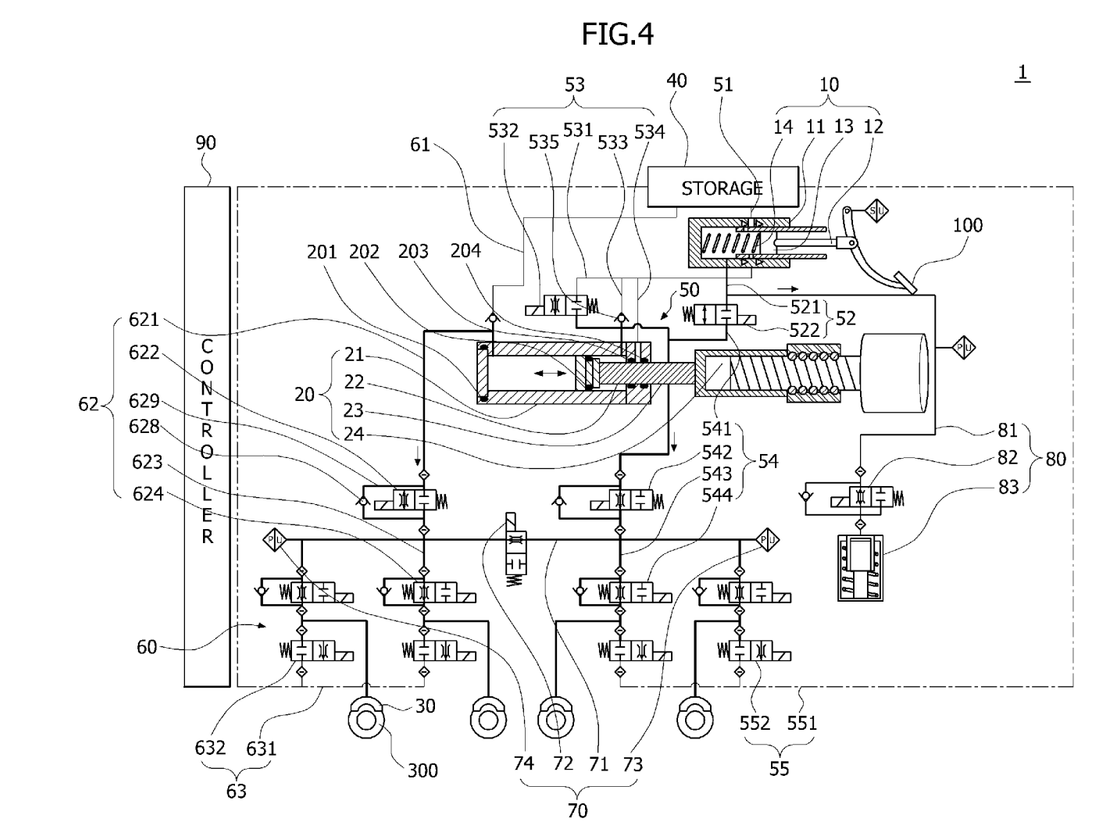
FIG. 4 is a diagram schematically illustrating the flow of fluid in a high pressure state in the electronic hydraulic brake device in accordance with the embodiment of the present invention.
Figure 5:
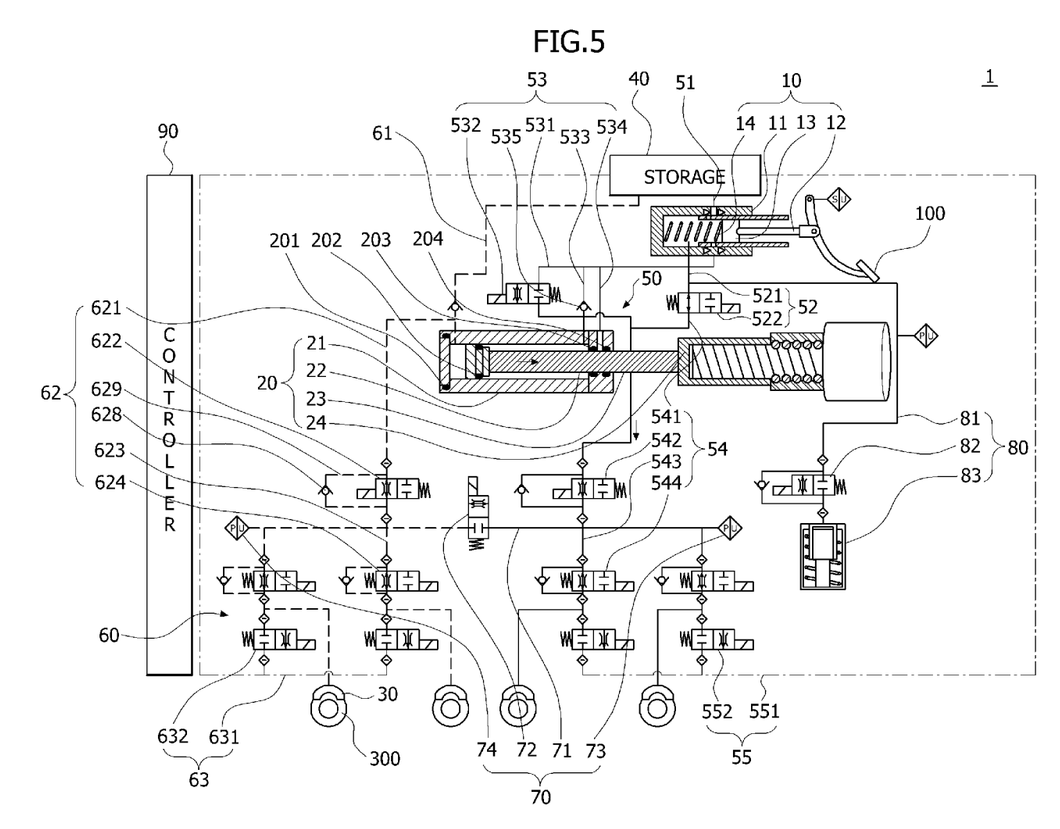
FIG. 5 is a diagram schematically illustrating the flow of fluid when a master circuit in the hydraulic brake device in accordance with the embodiment of the present invention is defective.
Figure 6:
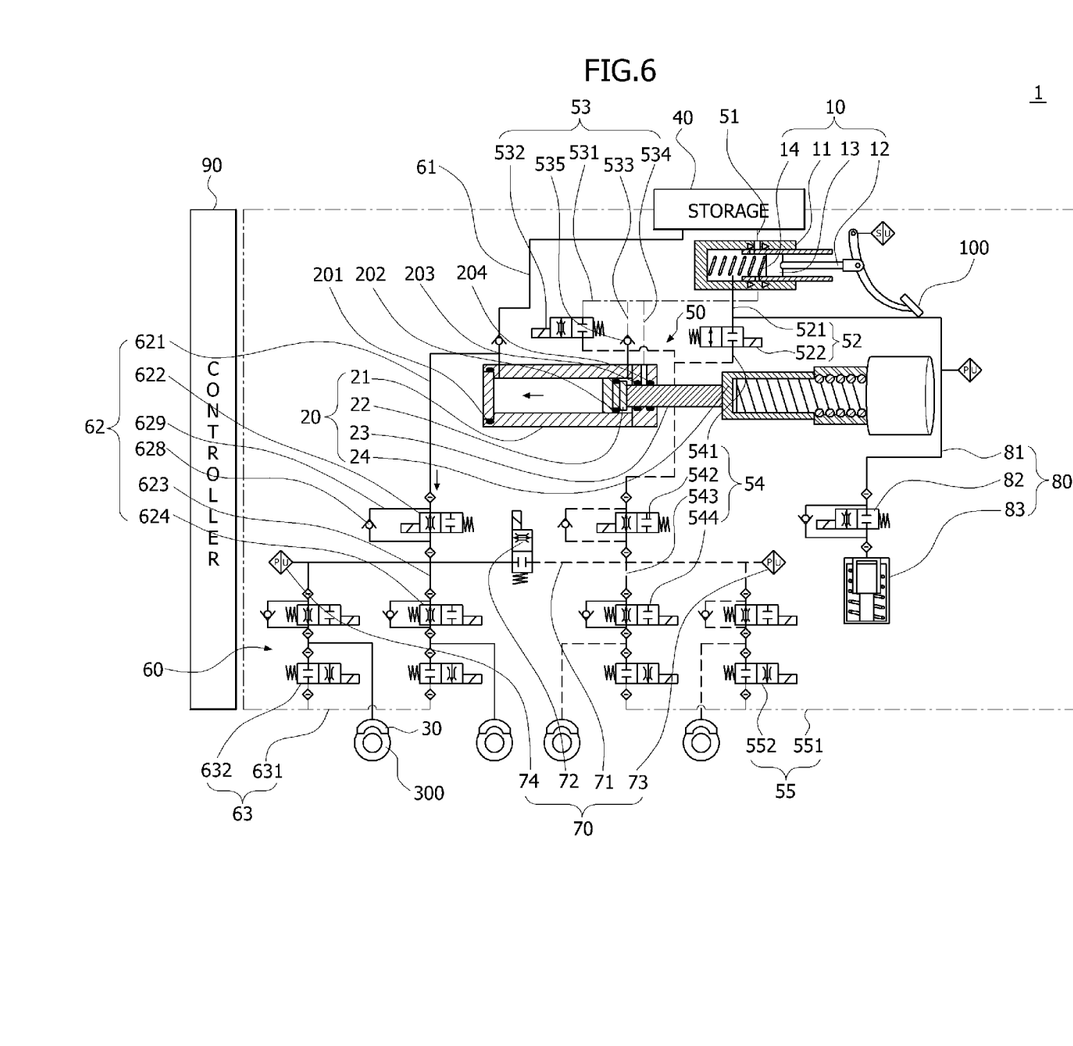
FIG. 6 is a diagram schematically illustrating the flow of fluid when a mixing circuit in the hydraulic brake device in accordance with the embodiment of the present invention is defective.

FIG. 4 is a diagram schematically illustrating the flow of fluid in a high pressure state in the electronic hydraulic brake device in accordance with the embodiment of the present invention, FIG. 5 is a diagram schematically illustrating the flow of fluid when a master circuit in the hydraulic brake device in accordance with the embodiment of the present invention is defective, and FIG. 6 is a diagram schematically illustrating the flow of fluid when a mixing circuit in the hydraulic brake device in accordance with the embodiment of the present invention is defective.

Referring to FIGS. 1 to 6, an electronic hydraulic brake device 1 in accordance with an embodiment of the present invention includes a pedal cylinder 10, a master cylinder 20, a wheel cylinder 30, a storage 40, a mixing circuit 50, a master circuit 60, and a hydraulic compartment 70.

The pedal cylinder 10 generates an oil pressure by a pressure of a pedal 100. The pedal cylinder 10 forms one chamber.

In accordance with the embodiment of the present invention, the pedal cylinder 10 includes a pedal housing 11, a pedal rod 12, a pedal piston 13, and a restoring spring 14.

The pedal housing 11 has one portion (right of FIG. 1) which is opened and the pedal rod 12 is connected to the pedal 100 and is inserted into the opened portion of the pedal housing 11.

The pedal piston 13 is coupled with the pedal rod 12 and adheres to an inner side of the pedal housing 11 and the restoring spring 14 is built into the pedal housing 11 and supports the pedal piston 13.

Therefore, when a driver presses the pedal 100, the pedal piston 13 coupled with the pedal rod 12 moves from right to left of the pedal housing 11 to increase a pressure of the fluid stored in the pedal housing 11 (see FIG. 1).

The master cylinder 20 senses the pedal 100 to generate an oil pressure. The master cylinder 20 forms one chamber.

In accordance with the embodiment of the present invention, the master cylinder 20 includes a master housing 21, a master piston 22, a master rod 23, and a driving motor 24.

The master housing 21 has a cylindrical shape in which the fluid is stored and the master piston 22 is built into the master housing 21 and adheres to an inner side of the master housing 21.

The master rod 23 is coupled with the master piston 22 and penetrates through the master housing 21, and the driving motor 24 is coupled with the master rod 23, in which a length of the master rod 23 is controlled by a driving of the driving motor 24.

Therefore, when the driving motor 24 is driven, the master piston 22 moves from right to left inside the master housing 21 or moves from left to right of the master housing 21 (see FIG. 1).

Meanwhile, the master cylinder 20 includes a first sealing 201, a second sealing 202, a third sealing 203, and a fourth sealing 204 (see FIG. 1).

The first sealing 201: is mounted at a right end of the master housing 21 to suppress a leakage of fluid.

The second sealing 202 is mounted at the master piston 22 and adheres to the inner side of the master housing 21. The master housing 21 which is a first chamber is compartmented by the second sealing 202 and the movement of fluid between the compartmented chambers is suppressed.

The third sealing 203 and the fourth sealing 204 are mounted at a left end of the master housing 21 and adhere to the master rod 23 to suppress the leakage of fluid.

The second sealing 202 and the third sealing 203 have durability to withstand the oil pressure, but are damaged during the long-term use to cause the leakage of fluid.

When the third sealing 203 is damaged, the fourth sealing 204 prevents the fluid from leaking to the driving motor 24.

The wheel cylinders 30 are each mounted at a plurality of wheels 300 and when the wheel cylinders 30 are applied with an oil pressure, the wheel cylinders 30 apply a braking force to the wheels 300.

In accordance with the embodiment of the present invention, the wheel 300 is generally divided into four, that is, a front right wheel FR, a front left wheel FL, a rear right wheel RR, and a rear left wheel RL.

As illustrated in FIG. 1, the rear left wheel RL, the front right wheel FR, the front left wheel FL, and the rear right wheel RR are sequentially disposed from right to left and each of them is provided with the wheel cylinders 30.

The storage 40 stores a fluid and serves to perform a buffering action of the oil pressure generated from the electronic hydraulic brake device 1.

The mixing circuit 50 connects the pedal cylinder 10 to some of the wheel cylinders 30 and guides the fluid. Further, the mixing circuit 50 communicates with the storage 40 and the master cylinder 20.

In accordance with the embodiment of the present invention, the mixing circuit 50 is connected to the wheel cylinders 30 which are mounted at the front left wheel FL and the rear right wheel RR, respectively.

The master circuit 60 connects the master cylinder 20 to the wheel cylinder 30 which is not connected to the mixing circuit 50 and guides the fluid and communicates with the storage 40.

In accordance with the embodiment of the present invention, the master circuit 60 is connected to the wheel cylinders 30 which are mounted at the rear left wheel RL and the front right wheel FR, respectively.

The hydraulic compartment 70 connects the mixing circuit 50 to the master circuit 60. The hydraulic compartment 70 connects or disconnects the mixing circuit 50 and the master circuit 60 to or from each other.

When any one of the mixing circuit 50 and the master circuit 60 is damaged, the hydraulic compartment 70 disconnects the mixing circuit 50 from the master circuit 60 to prevent the fluid from losing.

In accordance with the embodiment of the present invention, the electronic hydraulic brake device 1 further includes a foot effort providing part 80.

The foot effort providing part 80 is connected to the pedal cylinder 10 and provides a foot effort to the pedal 100.

In accordance with the embodiment of the present invention, the foot effort providing part 80 includes a foot effort passage 81, a foot effort valve 82, and a foot effort providing device 83.

The foot effort passage 81 has one end connected to the pedal cylinder 10 and the other end connected to the foot effort provider 83. The foot effort valve 82 is mounted in the foot effort passage 81 to open and close the foot effort passage 81.

Therefore, when a driver presses on the pedal 100, the fluid stored in the pedal housing 11 is supplied to the foot effort provider 83 through the foot effort passage 81 and the foot effort provider 83 provides a foot effort to the pedal 100 by the buffering action against the oil pressure.

In this case, the foot effort passage 81 is not directly connected to the pedal housing 81 but is connected to the pedal housing 11 to be connected to the mixing circuit 50 to which the fluid moves.

Meanwhile, the electronic hydraulic brake device 1 in accordance with the embodiment of the present invention may further a controller 90.

The controller 90 controls various types of sensors or valves which are included in the electronic hydraulic brake device 1 to control the oil pressure reaching the wheel cylinder 30.

The mixing circuit 50 in accordance with the embodiment of the present invention includes a pedal storage 51, a pedal interruption part 52, a mixing interruption part 53, a mixing braking part 54, and a mixing storage 55.

The pedal storage 51 connects the storage 40 to the pedal cylinder 10. In accordance with the embodiment of the present invention, one end of the pedal storage 51 is connected to the storage 40 and the other end of the pedal storage 51 is connected to the pedal housing 11.

The pedal interruption part 52 is connected to the pedal cylinder 10 to interrupt the fluid and the mixing interruption part 53 connects the pedal cylinder 10 to the master cylinder 20 to interrupt the fluid.

The mixing braking part 54 connects the pedal interruption part 52 to the mixing interruption part 53. Further, the mixing braking part 54 is connected to the wheel cylinder 30 to interrupt the fluid.

The mixing storage 55 connects the mixing braking part 54 to the storage 40 and guides the fluid stored in the mixing braking part 54 to the storage 40.

The pedal interruption part 52 in accordance with the embodiment of the present invention includes a pedal interruption passage 521 and a pedal interruption valve 522.

The pedal interruption passage 521 is connected to the pedal cylinder 10. In accordance with the embodiment of the present invention, the pedal interruption passage 521 has one end connected to the pedal housing 11 and the other end connected to the pedal interruption valve 522 and guides the fluid stored in the pedal housing 11.

The pedal interruption valve 522 is mounted in the pedal interruption passage 521 to open and close the pedal interruption passage 521.

Meanwhile, the foot effort passage 81 of the foot effort providing part 80 is not directly connected to the pedal housing 11, but may be connected to the pedal interruption passage 521.

The mixing interruption part 53 in accordance with the embodiment of the present invention includes a mixing interruption passage 531, a mixing interruption valve 532, a mixing check passage 533, and a mixing control passage 534.

The mixing interruption passage 531 is connected to the pedal cylinder 10. In accordance with the embodiment of the present invention, the mixing interruption passage 531 has one end connected to the pedal housing 11 and the other end connected to the mixing interruption valve 532 and guides the fluid stored in the pedal housing 11.

The mixing interruption valve 532 is mounted in the mixing interruption passage 531 to open and close the mixing interruption passage 531.

The mixing interruption valve 532 uses a solenoid valve of a normal close type which is closed in a normal state and is operated to be opened depending on a control signal of the controller 90.

The mixing check passage 533 connects the mixing interruption passage 531 to the master cylinder 20 and includes a mixing check valve 535.

In accordance with the embodiment of the present invention, one end of the mixing check passage 533 is connected to the mixing interruption passage 531. The other end of the mixing check passage 533 is connected to the master housing 21 so as to communicate with a right chamber (based on FIG. 1) which is compartmented by the master piston 22.

The mixing check valve 535 mounted in the mixing check passage 533 provides a fluid movement from the pedal cylinder 10 to the master cylinder 20 and limits the fluid movement in a reverse direction.

In accordance with the embodiment of the present invention, the mixing check passage 533 communicates with the master housing 21 which is mounted between the second sealing 202 and the third sealing 203.

The mixing control passage 534 connects the mixing interruption passage 531 to the master circuit 20.

In accordance with the embodiment of the present invention, one end of the mixing control passage 534 is connected to the mixing interruption passage 531. The other end of the mixing check passage 533 communicates with the master housing 21 between the third sealing 203 and the fourth sealing 204.

When the third sealing 203 is damaged, the fourth sealing 204 prevents the fluid from leaking to the driving motor 24, and the fluid may move to the storage 40 through the mixing control passage 534 which is mounted between the third sealing 203 and the fourth sealing 204.

The mixing braking part 54 in accordance with the embodiment of the present invention includes a mixing connection passage 541, a mixing connection valve 542, a mixing braking passage 543, and a mixing braking valve 544.

The mixing connection passage 541 connects the pedal interruption valve 522 to the mixing interruption valve 532 and communicates with the mixing check passage 533. In accordance with the embodiment of the present invention, the mixing connection passage 541 is connected to the mixing check passage 535 which is mounted between the mixing check valve 535 and the master cylinder 20.

The mixing connection passage 541 extends to guide the fluid passing through the pedal interruption valve 522 and the mixing interruption valve 532 toward the wheel cylinder 30, in which the extending mixing connection passage 541 is provided with the mixing connection valve 542 which opens and closes the mixing connection passage 541.

The mixing connection valve 542 uses a solenoid valve of a normal open type which is opened in a normal state and is operated to be closed depending on the control signal of the controller 90.

The mixing braking passage 543 has one end connected to the mixing connection valve 542 and the other end connected to the wheel cylinder 30 and guides the fluid passing through the mixing connection valve 542 to the wheel cylinder 30.

In accordance with the embodiment of the present invention, the mixing braking passage 543 is branched to guide the fluid to the wheel cylinders 30 which are mounted at the front left wheel FL and the rear right wheel RR, respectively.

The mixing braking valve 544 is mounted in the mixing braking passage 543 to open and close the mixing braking passage 543.

The mixing storage 55 in accordance with the embodiment of the present invention includes a mixing storage passage 551 and a mixing storage valve 552.

The mixing storage passage 551 connects the mixing braking passage 543 to the storage 40 and guides the fluid providing a braking pressure to the wheel cylinder 30 so as to restore the fluid to the storage 40.

The mixing storage valve 552 is mounted in the mixing storage passage 551 to open and close the mixing storage passage 551.

The master circuit 60 in accordance with the embodiment of the present invention includes a master supply part 61, a master braking part 62, and a master storage 63.

The master supply part 61 connects the storage 40 to the master cylinder 20 and includes a supply check valve 611.

The supply check valve 611 provides the fluid movement from the storage 40 to the master cylinder 20 and limits the fluid movement in a reverse direction.

In accordance with the embodiment of the present invention, the master supply part 61 communicates with the master cylinder 21 which is mounted between the first sealing 201 and the second sealing 202.

The master braking part 62 connects the master cylinder 20 to the wheel cylinder 30 and interrupts the fluid.

The master storage 63 connects the master braking part 62 to the storage 40 and guides the fluid.

The master braking part 54 in accordance with the embodiment of the present invention includes a master connection passage 621, a master connection valve 622, a master braking passage 623, and a master braking valve 624.

The master connection passage 621 has one end connected to the master supply part 61. In accordance with the embodiment of the present invention, one end of the master connection passage 621 communicates with the master supply part 61 which is mounted between the supply check valve 611 and the master housing 21.

The master connection passage 621 extends to guide the fluid supplied from the master housing 21 toward the wheel cylinder 30, in which the extending master connection passage 621 is provided with the master connection valve 622 which opens and closes the master connection passage 621.

The master connection valve 622 uses the solenoid valve of the normal open type which is opened in a normal state and is operated to be closed depending on the control signal of the controller 90.

The master braking passage 623 has one end connected to the master connection valve 622 and the other end connected to the wheel cylinder 30 and guides the fluid passing through the mixing connection valve 622 to the wheel cylinder 30.

In accordance with the embodiment of the present invention, the master braking passage 623 is branched to guide the fluid to the wheel cylinders 30 which are mounted at the rear left wheel RL and the front right wheel FR, respectively.

The master braking valve 624 is mounted in the master braking passage 623 to open and close the master braking passage 623.

The master storage 63 in accordance with the embodiment of the present invention includes a master storage passage 631 and a master storage valve 632.

The master storage passage 631 connects the master braking passage 623 to the storage 40 and guides the fluid providing the braking pressure to the wheel cylinder 30 so as to restore the fluid to the storage 40.

The master storage valve 632 is mounted in the master storage passage 631 to open and close the master storage passage 631.

The hydraulic compartment 70 in accordance with the embodiment of the present invention includes a hydraulic passage 71, a compartment valve 72, a mixing measuring device 73, and a master measuring device 74.

The hydraulic passage 71 connects the mixing circuit 50 to the master circuit 60. In accordance with the embodiment of the present invention, a right end of the hydraulic passage 71 is connected to the mixing braking passage 543 and a left end of the hydraulic passage 71 is connected to the master braking passage 623 (see FIG. 1).

The compartment valve 72 is mounted in the hydraulic passage 71 to open and close the hydraulic passage 71, thereby connecting or disconnecting the mixing circuit 50 and the master circuit 60 to or from each other.

The mixing measuring device 73 is mounted in the mixing circuit 50 to measure the oil pressure of the mixing circuit 50 and the master measuring device 74 is mounted in the master circuit 60 to measure the oil pressure of the master circuit 60.

In accordance with the embodiment of the present invention, the mixing measuring device 73 measures the oil pressure of the mixing braking passage 543 and transmits the measured signal to the controller 90 and the master measuring device 74 measures the oil pressure of the master braking passage 623 and transmits the measured signal to the controller 90.

The controller 90 receives the measurement signal thereof to control the compartment valve 72 to open and close the hydraulic passage 71.

In the electronic hydraulic brake device in accordance with the embodiment of the present invention having the above-mentioned structure, when the controller 90 is damaged, the flow of fluid will be described below (see FIG. 2).

When the controller 90 is damaged, the driving motor 24 of the master cylinder 20 is not driven. In this case, the mixing connection valve 542 opens the mixing connection passage 541 and the master connection valve 622 opens the master connection passage 621.

Further, the mixing interruption valve 532 closes the mixing interruption passage 531 and the compartment valve 72 closes the hydraulic passage 71. The pedal interruption valve 522 opens the pedal interruption passage 521.

When the driver presses on the pedal 100 in the state in which the controller 90 is damaged, the pressure of the fluid stored in the pedal housing 11 is increased.

A portion of the fluid stored in the pedal housing 11 moves the wheel cylinders 30 which are each mounted at the front left wheel FL and the rear right wheel RR through the mixing braking part 54 and thus provides the braking force to the wheel cylinders 30.

Further, a portion of the fluid stored in the pedal housing 11 is supplied to the master housing 21 through the mixing check passage 533 which communicates with the mixing connection passage 541.

The fluid supplied to the right of the master housing 21 moves the master piston 22 to the left.

When the master piston 22 moves to the left, the pressure of the fluid stored in the master housing 21 is increased.

The fluid stored in the master housing 21 moves the wheel cylinders 30 which are each mounted at the rear left wheel RL and the front right wheel FR through the master braking part 62 and thus provides the braking force to the wheel cylinders 30.

In the electronic hydraulic brake device 1 in accordance with the embodiment of the present invention, the flow of the fluid which performs the normal low pressure braking will be described below (see FIG. 3).

At the time of the normal low pressure braking, the braking force is applied to the wheel cylinder 30 only by the oil pressure of the master cylinder 20.

At the normal low pressure braking, the mixing connection passage 541 is closed by the mixing connection valve 542 and the master connection passage 621 is opened by the master connection valve 622.

Further, the mixing interruption passage 535 is opened by the mixing interruption valve 532, the hydraulic passage 71 is opened by the compartment valve 72, and the pedal interruption passage 521 is closed by the pedal interruption valve 522.

When a driver presses on the pedal 100 in the above state, the fluid stored in the pedal housing 11 is supplied to the foot effort providing device 83 through the foot effort passage 81 and the foot effort providing device 83 provides the foot effort to the pedal 100 by the buffering action against the supplied fluid.

When the sensor senses the driver operation of the pedal 100, the driving motor 24 is driven by the control of the controller 90 to move the master piston 22 to the left.

When the master piston 22 moves to the left, the pressure of the fluid stored in the master housing 21 is increased and the high pressure fluid reaches the wheel cylinder 30 through the master braking part 62.

In this case, since the hydraulic passage 71 is opened by the compartment valve 72, a portion of the fluid supplied to the master braking part 62 reaches the wheel cylinder 30 connected to the mixing braking part 54.

Meanwhile, when the master piston 22 moves to the left, the fluid of the storage 40 is introduced into the right chamber of the master piston 22 through the mixing check passage 533.

In the electronic hydraulic brake device 1 in accordance with the embodiment of the present invention, the flow of the fluid which performs the normal high pressure braking will be described below (see FIG. 4).

The vehicle braking is performed by an ABS at the time of the normal high pressure braking and the braking force is provided to the wheel cylinder 30 only by a reciprocal oil pressure of the master cylinder 20.

In this case, the mixing connection passage 541 is opened by the mixing connection valve 542 and the master connection passage 621 is closed by the master connection valve 622.

Therefore, the fluid passing through the master connection valve 622 bypasses the master connection valve 622 and moves through a master bypass passage 629 connected to the master braking passage 623.

A bypass check valve 628 mounted in the master bypass passage 629 prevents the oil pressure of the master braking passage 623 from reflowing in the master connection passage 621.

Meanwhile, the mixing interruption passage 535 is opened by the mixing interruption valve 532, the hydraulic passage is opened by the compartment valve 72, and the pedal interruption passage 521 is closed by the pedal interruption valve 522.

When a driver presses on the pedal 100 in the above state, the fluid stored in the pedal housing 11 is supplied to the foot effort providing device 83 through the foot effort passage 81 and the foot effort providing device 83 provides the foot effort to the pedal 100 by the buffering action against the supplied fluid.

When the sensor senses the driver operation of the pedal 100, the driving motor 24 is driven by the control of the controller 90 to reciprocally move the master piston 22 to the left and the right.

When the master piston 22 moves to the left, the pressure of the fluid stored in the master housing 21 is increased.

In this case, the master connection valve 622 is closed to form the oil pressure even in the chamber mounted at the right of the master piston 22, thereby reducing an effective diameter of the master cylinder 20.

When the effective diameter of the master cylinder 20 is reduced, the relatively high oil pressure may be generated despite less torque of the driving motor 24.

Therefore, the oil pressure generated from the master cylinder 20 is introduced into the mixing braking part 54 and the master braking part 62 to provide the braking force to each of the wheel cylinders 30.

When the master piston 22 moves to the right, a cross sectional area of the master piston 22 of a ring type becomes the effective diameter, such that the high oil pressure is generated in the chambers mounted at the left and right of the master piston 22.

In this case, since the master connection valve 622 is closed, the fluid does not reflow to the left chamber of the master piston 22.

At the time of reducing the pressure after the high pressure operation, the controller 90 controls the master connection valve 622, the mixing interruption valve 532, the master storage valve 632, the mixing storage valve 552, and the driving motor 24 depending on the conditions.

Meanwhile, at the time of the high pressure operation, the oil pressure generated from the wheel cylinder 30 moves to the storage 40 through the master storage valve 632 and the mixing storage valve 552.

When the fluid of the wheel cylinder 30 moves through the master storage valve 632 and the mixing storage valve 552 while continuously moving the master piston 22 reciprocally, the stroke of the master piston 22 is run up and thus the pressure is not formed.

Therefore, at the time of the high pressure operation, the fluid is continuously supplied to the passage while reciprocally operating the master piston 22 by using a principle of a plunger pump.

That is, when the master piston 22 moves to the left, the fluid is supplied to the chamber mounted at the right of the master piston 22 through the mixing check valve 535 which is mounted in the mixing check passage 533.

Further, when the master piston 22 moves to the right, the fluid of the storage 40 is introduced into the chamber mounted at the left of the master piston 22 through the supply check valve 611 which is mounted in the master supply part 61.

In the electronic hydraulic brake device 1 in accordance with the embodiment of the present invention, when the master circuit 60 is damaged, the flow of the fluid will be described below (see FIG. 5).

The fluid is pressed in the state in which the pedal interruption valve 521 is closed at the time of the initialization of the controller 90 and when the master measuring device 74 does not sense the pressure, the controller 90 is considered that the master circuit 60 is damaged.

When the master circuit 60 is damaged, the compartment valve 72 is closed and the initial position of the master piston 22 moves to the left of the master housing 21, by the control of the controller 90.

When a driver presses on the pedal 100 in the above state, the fluid stored in the pedal housing 11 is supplied to the foot effort providing device 83 through the foot effort passage 81 and the foot effort providing device 83 provides the foot effort to the pedal 100 by the buffering action against the supplied fluid.

When the sensor senses the driver operation of the pedal 100, the driving motor 24 is driven by the control of the controller 90 to move the master piston 22 to the right.

When the master piston 22 moves to the right, the fluid stored in the master housing 21 reaches the wheel cylinder 30 through the mixing braking part 54.

In the electronic hydraulic brake device 1 in accordance with the embodiment of the present invention, when the mixing circuit 50 is damaged, the flow of the fluid will be described below (see FIG. 6).

The fluid is pressed in the state in which the pedal interruption valve 521 is closed at the time of the initialization of the controller 90 and when the mixing measuring device 73 does not sense the pressure, the controller 90 is considered that the mixing circuit 50 is damaged.

When the mixing circuit 50 is damaged, the compartment valve 72 is closed and the initial position of the master piston 22 moves to the right of the master housing 21, by the control of the controller 90.

When a driver presses on the pedal 100 in the above state, the fluid stored in the pedal housing 11 is supplied to the foot effort providing device 83 through the foot effort passage 81 and the foot effort providing device 83 provides the foot effort to the pedal 100 by the buffering action against the supplied fluid.

When the sensor senses the driver operation of the pedal 100, the driving motor 24 is driven by the control of the controller 90 to move the master piston 22 to the left.

When the master piston 22 moves to the left, the fluid stored in the master housing 21 reaches the wheel cylinder 30 through the master braking part 62.

In this case, the master storage valve 632 is opened to connect the master braking part 62 to the storage 40, thereby running up the oil pressure which remains in the master braking part 62.

The electronic hydraulic brake device 1 ion accordance with the embodiment of the present invention may perform the manual bleeding even though it is not supplied with power.

According to the electronic hydraulic brake device 1 in accordance with the embodiments of the present invention, the pedal cylinder 10 may form one chamber, thereby reducing the size of the pedal cylinder 10.

According to the electronic hydraulic brake device 1 in accordance with the embodiments of the present invention, the master cylinder 20 may form one chamber, thereby reducing the number of components and simplifying the hydraulic circuit.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. An electronic hydraulic brake system, comprising:
a pedal cylinder configured to generate an oil pressure in response to movement of a brake pedal;
a master cylinder comprising a first fluid compartment and a second fluid compartment divided by a master piston such that each of the first and second fluid compartments have a volume that varies as the master piston moves within the master cylinder;
a piston driving mechanism configured to move the master piston within the master cylinder in a first direction to make the volume of the first fluid compartment smaller;

a controller configured to generate control signals for controlling the piston driving mechanism in accordance with movement of the brake pedal;

a plurality of wheel cylinders configured to provide a braking force to be applied to wheels, the plurality of wheel cylinders comprising a first wheel cylinder in fluid communication with the first fluid compartment of the master cylinder such that a fluid pressure within the first fluid compartment is transmitted to the first wheel cylinder; and a mixing circuit configured to selectively connect and disconnect between the pedal cylinder and the second fluid compartment of the master cylinder;

wherein when the control signals for controlling the piston driving mechanism are available, the mixing circuit disconnects the second fluid compartment from the pedal cylinder, and the first wheel cylinder is driven by the master piston's movement in the first direction with operation of the piston driving mechanism based on the control signals, wherein when the control signals are not available, the mixing circuit connects the pedal cylinder to the second fluid compartment such that the pedal cylinder and the second fluid compartment are in fluid communication, and the oil pressure generated in the pedal cylinder is transmitted to the second fluid compartment to move the master piston in the first direction, whereby the first wheel cylinder is driven by the oil pressure of the pedal cylinder without operation of the piston driving mechanism.

2. The electronic hydraulic brake device of claim 1, wherein the pedal cylinder is provided with a single chamber.

3. The electronic hydraulic brake device of claim 1, the system comprising:

a storage configured to store a fluid;

a pedal storage configured to connect the storage and the pedal cylinder for allowing the fluid flow from the storage flow into the pedal cylinder;

a pedal interruption part connected to the pedal cylinder and configured to selectively interrupt the fluid from the pedal cylinder;

a mixing interruption part configured to connect the pedal cylinder to the master cylinder, and configured to selectively interrupt the fluid from the pedal cylinder to the master cylinder;

a mixing braking part configured to connect the pedal interruption part to the mixing interruption part, wherein the mixing braking part is connected the first wheel cylinder and configured to selectively interrupt the fluid into the first wheel cylinder; and a mixing storage configured to connect the mixing braking part and the storage and to guide the fluid flow from the mixing braking part back to the storage.

4. The electronic hydraulic brake system of claim 3, wherein the pedal interruption part includes:

a pedal interruption passage connected to the pedal cylinder; and a pedal interruption valve mounted in the pedal interruption passage and configured to open and close the pedal interruption passage.

5. The electronic hydraulic brake system of claim 4, wherein the mixing interruption part includes:

a mixing interruption passage connected to the pedal cylinder;

a mixing interruption valve mounted in the mixing interruption passage and configured to open and close the mixing interruption passage;

a mixing cheek passage configured to connect the mixing interruption passage to the master cylinder and be provided with a check valve; and a mixing control passage configured to connect the mixing interruption passage to the master cylinder and guide the fluid.

6. The electronic hydraulic brake system of claim 5, wherein the mixing interruption valve is a solenoid valve of a normal close type which is closed in a normal state and operated to be opened depending on a control signal.

7. The electronic hydraulic brake system of claim 5, wherein the mixing braking part includes:

a mixing connection passage configured to connect the pedal interruption valve to the mixing interruption valve and communicate with the mixing check passage;

a mixing connection valve mounted in the mixing connection passage and configured to open and close the mixing connection passage;

a mixing braking passage configured to connect the mixing connection valve to the first wheel cylinder; and a mixing braking valve mounted in the mixing braking passage and configured to open and close the mixing braking passage.

8. The electronic hydraulic brake system of claim 7, wherein the mixing connection valve is a solenoid valve of a normal open type which is opened in a normal state and operated to be closed depending on a control signal.

9. The electronic hydraulic brake device system of claim 7, wherein the mixing storage includes:

a mixing storage passage configured to connect the mixing braking passage to the storage; and a mixing storage valve mounted in the mixing storage passage and configured to open and close the mixing storage passage.

10. The electronic hydraulic brake system of claim 1, wherein the system includes:

a storage configured to store a fluid;

a master circuit configured to connect the master cylinder to a second one of the plurality of wheel cylinders that is not connected to the mixing circuit, a master supply part configured to connect the storage to the master cylinder and be provided with a check valve;

a master braking part configured to connect the master cylinder to the second wheel cylinder and interrupt the fluid; and a master storage configured to connect the master braking part to the storage and guide the fluid.

11. The electronic hydraulic brake system of claim 10, wherein the master braking part includes:

a master connection passage configured to be connected to the master supply part;

a master connection valve mounted in the master connection passage and configured to open and close the master connection passage;

a master braking passage configured to connect the master connection valve to the wheel cylinder; and a master braking valve mounted in the master braking passage and configured to open and close the master braking passage.

12. The electronic hydraulic brake system of claim 11, wherein the master connection valve is a solenoid valve of a normal open type which is opened in a normal state and operated to be closed depending on a control signal.

13. The electronic hydraulic brake system of claim 11, wherein the master storage includes:

a master storage passage configured to connect the master braking passage to the storage; and a master braking valve mounted in the master storage passage and configured to open and close the master storage passage.

14. The system of claim 10, wherein the system includes:
a hydraulic passage configured to connect the mixing circuit to the master circuit;
a compartment valve mounted in the hydraulic passage and configured to open and close the hydraulic passage;
a mixing measure device mounted in the mixing circuit and configured to measure the oil pressure of the mixing circuit; and
a master measuring device mounted in the master circuit and configured to measure the oil pressure of the master circuit.

15. The electronic hydraulic brake system of claim 1, further comprising:
a foot effort providing part configured to be connected to the pedal cylinder and provide a foot effort to the pedal.

16. The electronic hydraulic brake system of claim 1, wherein the plurality of wheel cylinders comprises a second wheel cylinder in fluid communication with the pedal cylinder such that the oil pressure generated in the pedal cylinder is transmitted to the second wheel cylinder, whereby the second wheel cylinder is driven by the oil pressure of the pedal cylinder without operation of the piston driving mechanism.

* * * * *